US012491459B2

(12) United States Patent
Kaburagi et al.

(10) Patent No.: US 12,491,459 B2
(45) Date of Patent: Dec. 9, 2025

(54) COMPRESSOR

(71) Applicant: SANDEN AUTOMOTIVE COMPONENTS CORPORATION, Isesaki (JP)

(72) Inventors: Misako Kaburagi, Isesaki (JP); Atsuo Teshima, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 800 days.

(21) Appl. No.: 17/777,198

(22) PCT Filed: Sep. 18, 2020

(86) PCT No.: PCT/JP2020/035419
§ 371 (c)(1),
(2) Date: May 16, 2022

(87) PCT Pub. No.: WO2021/106329
PCT Pub. Date: Jun. 3, 2021

(65) Prior Publication Data

US 2022/0410048 A1 Dec. 29, 2022

(30) Foreign Application Priority Data

Nov. 26, 2019 (JP) ................................ 2019-213620

(51) Int. Cl.
*B01D 45/16* (2006.01)
*B04C 3/00* (2006.01)

(52) U.S. Cl.
CPC ................ *B01D 45/16* (2013.01); *B04C 3/00* (2013.01)

(58) Field of Classification Search
None
See application file for complete search history.

(56) References Cited

U.S. PATENT DOCUMENTS 4,279,578 A * 7/1981 Kim ...................... F04C 29/026 418/97
5,733,107 A * 3/1998 Ikeda ...................... F04B 39/04 417/313
(Continued)

FOREIGN PATENT DOCUMENTS

CN 101153593 A 4/2008
CN 106704197 A2 5/2017
(Continued)

OTHER PUBLICATIONS

Japan Patent Office, Notice of Reasons for Refusal issued in Japanese Patent Application No. 2019-213620, dated Oct. 17, 2023.
(Continued)

*Primary Examiner* — Brit E. Anbacht
(74) *Attorney, Agent, or Firm* — Baker Botts L.L.P.

(57) ABSTRACT

To improve separation performance of oil. An oil separation structure includes a partition member configured to partition the inside of a separation chamber in the up-down direction. The partition member includes a cylindrical support portion supported by an inner circumferential surface of the separation chamber and a cylindrical swirl acceleration portion having an upper end side continuously formed from the support portion, having a smaller diameter than the support portion, and having a lower end side closed, and the swirl acceleration portion has a communication path formed, the communication path communicating the radial inside and the radial outside with each other, and accelerates swirling of refrigerant, the refrigerant having descended while swirling along the inner circumferential surface of the separation chamber.

10 Claims, 8 Drawing Sheets

(56) References Cited

U.S. PATENT DOCUMENTS

| | | | | |
|---|---|---|---|---|
| 6,554,595 | B2 * | 4/2003 | Hida | F04C 29/026 96/209 |
| 7,490,541 | B2 * | 2/2009 | Kawata | F04C 29/026 92/154 |
| 7,736,136 | B2 * | 6/2010 | Ohtake | F04C 18/0276 55/423 |
| 2005/0002800 | A1 * | 1/2005 | Kimura | F04B 27/1081 417/321 |
| 2009/0142202 | A1 * | 6/2009 | Inoue | F04B 27/1081 417/313 |
| 2009/0246060 | A1 * | 10/2009 | Inoue | F04B 39/0207 62/470 |
| 2010/0209278 | A1 * | 8/2010 | Tarao | F04C 29/0057 418/55.3 |
| 2014/0023542 | A1 * | 1/2014 | Yamashita | F04C 18/0215 418/55.6 |
| 2020/0238207 | A1 | 7/2020 | Inoue et al. | |

FOREIGN PATENT DOCUMENTS

| | | | |
|---|---|---|---|
| JP | S55-117092 | A | 9/1980 |
| JP | 2008-082272 | A | 4/2008 |
| JP | 2014-20306 | A | 2/2014 |
| JP | 2015-215148 | A | 12/2015 |
| JP | 2017-172895 | A | 9/2017 |
| WO | 2019/064883 | A1 | 4/2019 |

OTHER PUBLICATIONS

The State Intellectual Property Office of the People's Republic of China, The First Office Action issued in Chinese Patent Application No. 202080078625.3, dated Feb. 26, 2024 (14 pages).

International Search Report issued in International Application No. PCT/JP2020/035419, mailed Oct. 27, 2020.

* cited by examiner

COMPRESSOR

CROSS-REFERENCE TO RELATED APPLICATIONS

This application is a U.S. National Stage Patent Application under 37 U.S.C. § 371 of International Patent Application No. PCT/JP2020/035419, filed on Sep. 18, 2020, which claims the benefit of Japanese Patent Application No. JP 2019-213620, filed on Nov. 26, 2019, the disclosures of each of which are incorporated herein by reference in their entirety.

TECHNICAL FIELD

The present invention relates to a compressor.

BACKGROUND ART

In PTL 1, a structure to separate oil from refrigerant by centrifugation is disclosed, and, in the structure, a partition plate configured to suppress splashing of the oil is disposed above an oil sump in a container. On the periphery of the partition plate, a notch communicating one side with the other side in the up-down direction is formed, and the oil flows to the oil sump through the notch.

CITATION LIST

Patent Literature

PTL 1: JP 2015-215148 A

SUMMARY OF INVENTION

Technical Problem

Even when a partition plate is disposed as in the technology described in Background Art, it is considered that a configuration in which only a simple notch communicating one side with the other side in the up-down direction is formed allows not only the oil but also the refrigerant to pass the notch. There is a possibility that the refrigerant having passed the partition plate causes blowing up of the oil to occur in the oil sump located below the partition plate, which causes separation performance of oil to deteriorate. Therefore, there has been room for improvement in the separation performance of oil.

A problem to be solved by the present invention is to improve separation performance of oil.

Solution to Problem

According to an aspect of the present invention, there is provided a compressor configured to compress a heat transfer medium containing oil, including an oil separation structure configured to separate the heat transfer medium and the oil, the heat transfer medium and the oil being compressed, from each other, wherein the oil separation structure includes: a separation chamber, the separation chamber being a cylindrical internal space with a central axis aligned with an up-down direction, configured to separate the heat transfer medium and the oil from each other by causing the heat transfer medium and the oil to flow into the separation chamber and swirl along an inner circumferential surface in a circumferential direction; and a partition member configured to partition an inside of the separation chamber in the up-down direction, the partition member includes: a cylindrical support portion supported by an inner circumferential surface of the separation chamber; and a cylindrical swirl acceleration portion having an upper end side continuously formed from the support portion, having a smaller diameter than the support portion, and having a lower end side closed, and the swirl acceleration portion has a communication path formed, the communication path communicating a radial inside and a radial outside with each other, and accelerates swirling of the heat transfer medium, the heat transfer medium having descended while swirling along the inner circumferential surface of the separation chamber.

Advantageous Effects of Invention

According to the present embodiment, since the communication path communicating the radial inside and the radial outside with each other is formed in the partition member, a heat transfer medium becomes less likely to pass the partition member compared with a case of using a simple structure in which one side is communicated with the other side in the up-down direction. Since the swirl acceleration portion has a smaller diameter than the support portion in the partition member, the heat transfer medium, which has descended while swirling along the inner circumferential surface of the separation chamber, is accelerated in swirling. That is, since swirling speed of the heat transfer medium increases and intensity of a streamline in the swirling direction increases, the heat transfer medium in the gas phase becomes less likely to pass the communication path and the oil in the liquid phase passes the communication path and is smoothly exhausted. Therefore, the heat transfer medium is prevented from passing the partition member to the lower side and blowing up of the oil in an oil sump can be avoided as much as possible, which improves the separation performance of oil.

DESCRIPTION OF EMBODIMENTS

Hereinafter, embodiments of the present invention will be described with reference to the drawings. Each drawing is a schematic one and may differ from the actual one. In addition, the following embodiments exemplify a device and a method for embodying a technical idea of the present invention, and do not specify a configuration to the following. That is, the technical idea of the present invention can be modified in various ways within the technical scope described in Claims.

First Embodiment (Configuration)

Figure 1:
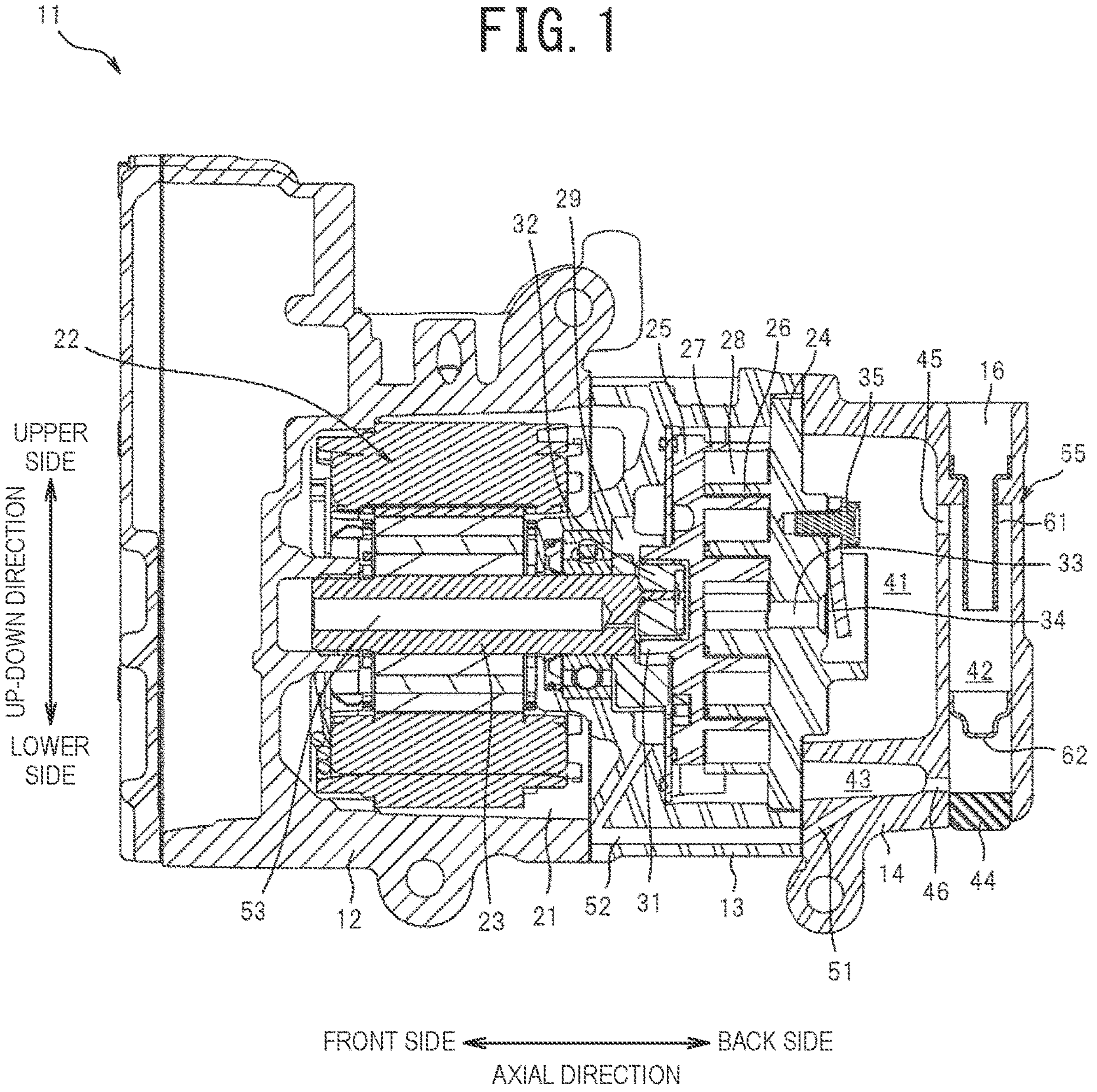
FIG. 1 is a cross-sectional view of a compressor along a front-back direction and an up-down direction.

FIG. 1 is a cross-sectional view of a compressor along the front-back direction and the up-down direction. A compressor 11 is an electrically-driven scroll compressor, which is used in, for example, a refrigerant circuit of a vehicle air conditioner, and sucks, compresses, and exhausts refrigerant (heat transfer medium). In the following description, for descriptive purposes, one side and the other side of the compressor 11 in the axial direction are defined as the front side and the back side, respectively.

The compressor 11 has a front housing 12, a center housing 13, and a rear housing 14, which are arranged in this order from the front side in the axial direction, integrated with one another in such a way as to maintain airtightness. In the front housing 12, a suction port (illustration is omitted) for sucking the refrigerant is formed, and, in the rear housing 14, an exhaust port 16 for exhausting the compressed refrigerant is formed. The front housing 12 includes a suction chamber 21, which is in communication with the suction port, and, in the suction chamber 21, an electric motor 22 is housed. A rotating shaft 23 of the electric motor 22 has the front side supported by the front housing 12 in a freely rotatable manner and the back side supported by the center housing 13 in a freely rotatable manner.

In the center housing 13, a stationary scroll 24 and a movable scroll 25 are housed. The disk-shaped stationary scroll 24 is fixed in such a way as to close the back side of the center housing 13 and has a spiral-shaped stationary-side wrap 26 formed on the front surface thereof. The disk-shaped movable scroll 25 is arranged on the front side of the stationary scroll 24 and has a spiral-shaped movable-side wrap 27 formed on the back surface thereof. The front surface of the stationary scroll 24 and the back surface of the movable scroll 25 face each other, and the stationary-side wrap 26 and the movable-side wrap 27 mesh with each other. The edge of the stationary-side wrap 26 slidably comes into contact with the back surface of the movable scroll 25 via a not-illustrated tip seal, and the edge of the movable-side wrap 27 slidably comes into contact with the front surface of the stationary scroll 24 via a not-illustrated tip seal. A compression chamber 28 for compressing the refrigerant is formed by areas enclosed by the front surface of the stationary scroll 24, the stationary-side wrap 26, the back surface of the movable scroll 25, and the movable-side wrap 27. When viewed in the axial direction, the compression chamber 28 is formed in substantially crescent-shaped sealed spaces.

On the front side of the movable scroll 25, a back pressure chamber 29 is formed. High pressure oil, which will be described later, being supplied to the back pressure chamber 29 causes the movable scroll 25 to be pressed against the stationary scroll 24 and sealability of the compression chamber 28 to be thereby improved. A boss 31 is formed on the front surface of the movable scroll 25, a crank end portion 32, which is made eccentric, is formed on the back end of the rotating shaft 23, and the crank end portion 32 is fitted into the boss 31 in a freely rotatable state. Rotational motion of the rotating shaft 23 is transmitted to the movable scroll 25 as orbiting motion by the crank end portion 32. The movable scroll 25 is prevented from rotating by means of, for example, a pin and hole mechanism and is allowed to orbit with respect to the stationary scroll 24.

At the center of the stationary scroll 24, a discharge hole 33, which penetrates the stationary scroll 24 in the front-back direction, is formed, and, on the back surface of the stationary scroll 24, a discharge valve 34, which is capable of opening and closing a back end side of the discharge hole 33, is disposed. The discharge valve 34 is an elastically deformable plate material and, with an upper end side thereof fastened to the back surface of the stationary scroll 24 via a bolt 35, closes the back end side of the discharge hole 33 with a lower end side thereof. When the movable scroll 25 orbits with respect to the stationary scroll 24, the compression chamber 28 changes its position toward the scroll center while decreasing its volume. When the compression chamber 28 is located on the outside of the scroll, the compression chamber 28 communicates with the suction chamber 21 and sucks the refrigerant, and, when the compression chamber 28 is located at the scroll center, the compression chamber 28 communicates with the discharge hole 33 and discharges the compressed refrigerant. When the discharge valve 34 is elastically deformed under discharge pressure, the discharge valve 34 causes the refrigerant to be discharged with the lower end side bent backward. On the back side of the stationary scroll 24, a discharge chamber 41, which is covered by the rear housing 14, is formed.

The rear housing 14 includes a separation chamber 42 configured to separate the refrigerant and the oil from each other and a storage chamber 43 configured to store separated oil. The oil separation will be described later. The separation chamber 42 is arranged on the back side of the discharge chamber 41 in the rear housing 14, and the storage chamber 43 is arranged on the front side of the separation chamber 42 and on the lower side of the discharge chamber 41 in the rear housing 14. The separation chamber 42 is a circular cylindrical hole that is bored from the under surface side of the rear housing 14, and has a lower end side sealed and closed by a closing member 44. The upper end of the separation chamber 42 communicates with the exhaust port 16. An upper portion of the separation chamber 42 communicates with the discharge chamber 41 via a communication hole 45, which penetrates the rear housing 14 in a horizontal direction. A bottom portion of the separation chamber 42 communicates with the storage chamber 43 via a communication hole 46, which penetrates the rear housing 14 in a horizontal direction.

In the rear housing 14, an oil return flow path 51, which communicates with the bottom surface of the storage chamber 43, is formed. In the center housing 13, an oil return flow path 52, one end of which communicates with the oil return flow path 51 and the other end of which communicates with the back pressure chamber 29, is formed. Therefore, oil stored in the storage chamber 43, under pressure from the high-pressure separation chamber 42, is supplied to the back pressure chamber 29, passing through the oil return flow path 51 and the oil return flow path 52 in this order. This configuration causes back pressure to be provided to the movable scroll 25 and lubrication of respective sliding portions including a bearing to be performed. Note that a choke is disposed at an intermediate point in the path from the storage chamber 43 to the back pressure chamber 29 and the oil is decompressed from high pressure to medium pressure by the choke and supplied to the back pressure chamber 29. Inside the rotating shaft 23, an oil return flow path 53, which extends along the axial direction and communicates with the back pressure chamber 29, is formed. Therefore, the oil supplied to the back pressure chamber 29 is further supplied to a front end side of the rotating shaft 23 via the oil return flow path 53. This configuration causes lubrication of respective sliding portions including a bearing to be performed. Note that a choke is disposed to the rotating shaft 23 and the oil that is decompressed from medium pressure to low pressure by the choke is supplied to the front end side of the rotating shaft 23.

Figure 2:
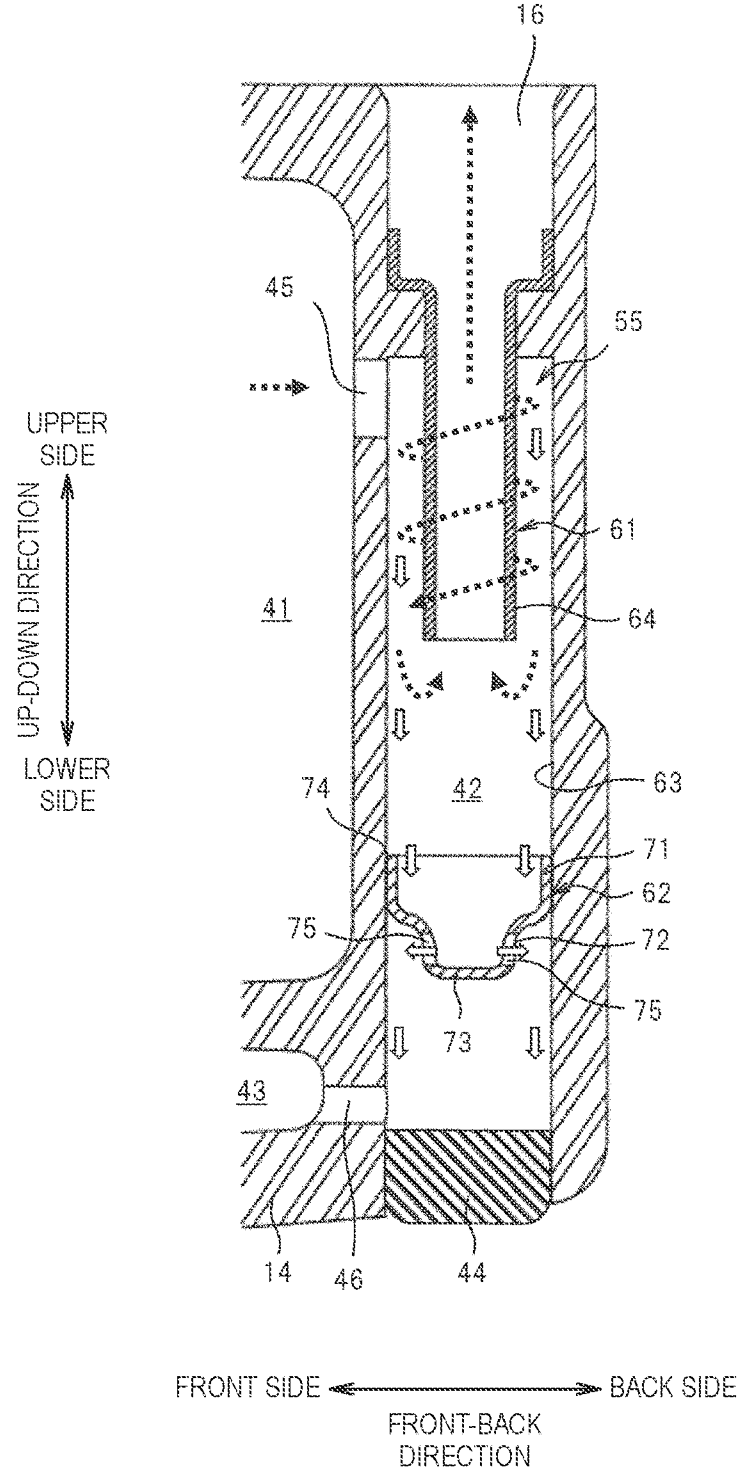
FIG. 2 is an enlarged cross-sectional view of a separation chamber.

Next, an oil separation structure 55 configured to separate the refrigerant and the oil from each other will be described. FIG. 2 is an enlarged cross-sectional view of the separation chamber 42. The oil separation structure 55 includes the separation chamber 42, an exhaust pipe 61, and a partition member 62. Since the separation chamber 42 is formed by a circular cylindrical hole bored from the under surface side of the rear housing 14 as described afore, the separation chamber 42 is a cylindrical internal space with the central axis aligned with the up-down direction. The exhaust pipe 61, which is formed in a cylindrical shape, is inserted into the separation chamber 42 from the upper side of the separation chamber 42, and the upper end of the exhaust pipe 61 is connected to the exhaust port 16. In the present embodiment, the lower end of the exhaust pipe 61 extends to substantially the center of the separation chamber 42 in the up-down direction. Outer diameter of the exhaust pipe 61 is smaller than inner diameter of the separation chamber 42, and, between an inner circumferential surface 63 of the separation chamber 42 and an outer circumferential surface 64 of the exhaust pipe 61, a gap is formed. In the drawing, arrows illustrated by dotted lines illustrate major flows of the refrigerant, and block arrows illustrate major flows of the oil. The refrigerant containing the oil that has flowed in from the communication hole 45 spirally descends between the inner circumferential surface 63 of the separation chamber 42 and the outer circumferential surface 64 of the exhaust pipe 61, and the refrigerant and the oil are separated from each other by centrifugal action at the time when the refrigerant swirls in the circumferential direction. The refrigerant in the gas phase flows into the exhaust pipe 61 from the lower end, ascends in the exhaust pipe 61, and is exhausted to the outside from the exhaust port 16. On the other hand, the separated oil descends along the inner circumferential surface 63 of the separation chamber 42.

Figure 3A:
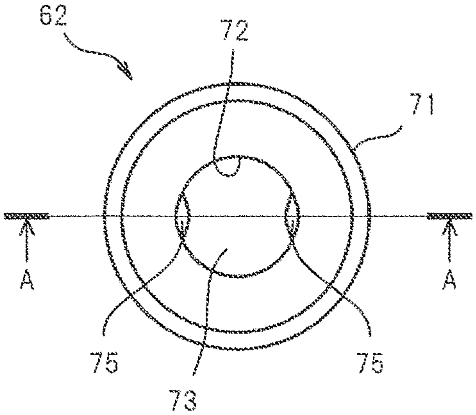
FIGS. 3A to 3C are diagrams illustrative of a partition member.
Figure 3B:
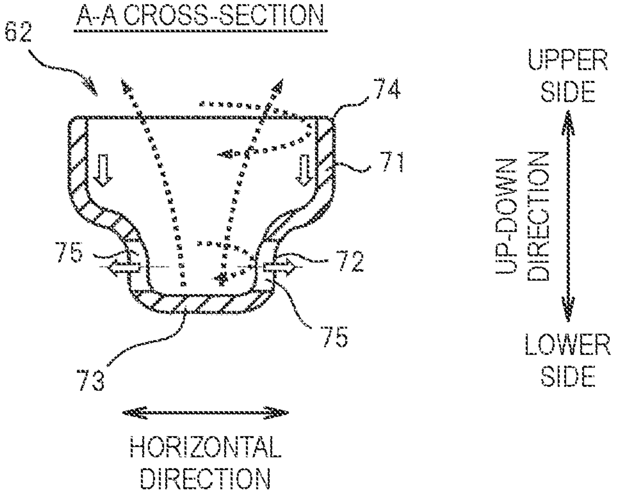
Figure 3C:
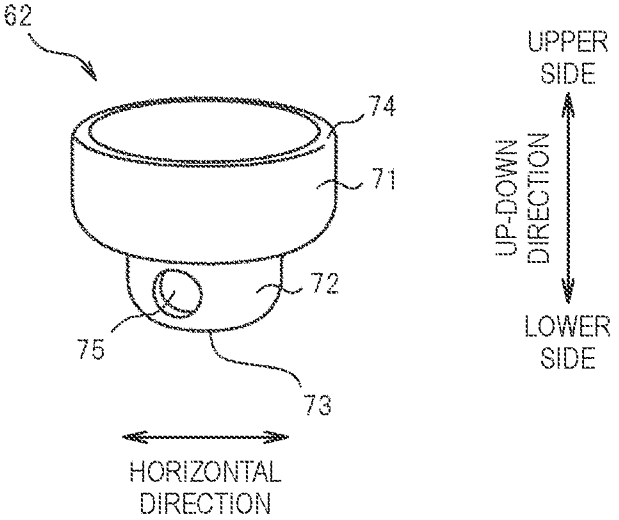

The partition member 62 partitions the inside of the separation chamber 42 in the up-down direction into an upper side and a lower side, and suppresses passage of the refrigerant to the lower side and allows passage of the oil to the lower side. The partition member 62 is press-fitted into the separation chamber 42 from the lower side. FIGS. 3A to 3C are diagrams illustrative of the partition member 62. FIGS. 3A, 3B, and 3C illustrate a plan view of the partition member 62 when viewed from above, a cross-section of the partition member 62 taken along the line A-A of FIG. 3A, and a perspective view of the partition member 62, respectively. The partition member 62 includes a support portion 71 and a swirl acceleration portion 72. The support portion 71 is formed in a cylindrical shape and supported by the inner circumferential surface 63 of the separation chamber 42. The swirl acceleration portion 72 is formed in a cylindrical shape that has smaller diameter than the support portion 71 and the lower end side of which is closed by a bottom portion 73, and has an upper end side continuously formed from the support portion 71. Specifically, the swirl acceleration portion 72 is located below the support portion 71, and the upper end side of the swirl acceleration portion 72 is continuously formed from a lower end side of the support portion 71. A part where the lower end side of the support portion 71 and the upper end side of the swirl acceleration portion 72 are continuously connected to each other is formed in an R shape. That is, the lower end side of the support portion 71 and the upper end side of the swirl acceleration portion 72 are connected to each other by a curved surface in such a manner that no step is generated. The partition member 62 is formed by press working.

In the swirl acceleration portion 72, a plurality of communication paths 75 that communicate the radial inside and the radial outside with each other are formed. The communication paths 75 are circular holes that are caused to penetrate the swirl acceleration portion 72 in radial directions and that have the same diameter, and are preferably two communication paths that are arranged to be opposed to each other in a straight line passing the center of a circle when viewed in the up-down direction. Therefore, the separated oil descends along an inner circumferential surface of the support portion 71 and an inner circumferential surface of the swirl acceleration portion 72 and is exhausted to the radially outer side through the communication paths 75. In this manner, the separated oil passes the partition member 62 to the lower side and flows to the storage chamber 43. The communication paths 75 are arranged in such a way as to touch an upper surface of the bottom portion 73 lest the oil stay on an inside bottom surface of the swirl acceleration portion 72.

Since the support portion 71 is press-fitted into the inner circumferential surface 63 of the separation chamber 42, an outer diameter dimension of the support portion 71 is set slightly larger than an inner diameter dimension of the separation chamber 42 in order to form an interference. On a corner portion 74 that is located on the radially outer side of the upper edge of the support portion 71, chamfering or R-chamfering (filleting) is performed. The swirl acceleration portion 72 is configured to have a smaller diameter than the support portion 71 in order to accelerate swirling of the refrigerant, which has descended while swirling along the inner circumferential surface 63 of the separation chamber 42. When an inner diameter dimension of the swirl acceleration portion 72 is made excessively small, exhaust performance of the oil deteriorates, and, when the inner diameter dimension of the swirl acceleration portion 72 is made excessively large, effect of accelerating the swirling of the refrigerant deteriorates. Therefore, the inner diameter dimension of the swirl acceleration portion 72 needs to be set to, for example, a value within a range from 40% to 60% of an inner diameter dimension of the support portion 71, and preferably set to approximately 50%. When thickness variation of cross sections is large with respect to an average thickness in the support portion 71, holding force of the support portion 71 at the time when the partition member 62 is press-fitted into the inner circumferential surface 63 of the separation chamber 42 deteriorates. Therefore, the thickness variation of the cross sections is set to a value less than or equal to 20% of the average thickness in the support portion 71.

(Operation)

Next, major operational effects of the first embodiment will be described. Although, as described afore, the refrigerant that has descended while swirling along the inner circumferential surface 63 of the separation chamber 42 is exhausted from the lower end of the exhaust pipe 61, a portion of the refrigerant further descends while swirling along the inner circumferential surface 63 of the separation chamber 42. The separated oil is likely to stay on the bottom of the separation chamber 42, and it is conceivable that, in order to prevent the high-pressure refrigerant from blowing up the staying oil, a partition plate is disposed and a notch to cause the oil to pass is formed on the partition plate. However, a configuration in which only a simple notch communicating one side with the other side in the up-down direction is formed allows not only the oil but also the refrigerant to pass through the notch. There is a possibility that, when the refrigerant passes the partition plate, blowing up of the oil occurs in an oil sump located below the partition plate and separation performance of oil deteriorates. Therefore, there has been room for improvement in the separation performance of oil.

Since, accordingly, in the present embodiment, the communication paths 75 communication the radial inside and the radial outside with each other are formed in the partition member 62, the refrigerant becomes less likely to pass the partition member 62 compared with a case of using the simple structure in which one side is communicated with the other side in the up-down direction. Since the swirl acceleration portion 72 has a smaller diameter than the support portion 71 in the partition member 62, the refrigerant, which has descended while swirling along the inner circumferential surface 63 of the separation chamber 42, is accelerated in swirling. In FIG. 3B, arrows illustrated by dotted lines illustrate flows of the refrigerant, and block arrows illustrate flows of the oil. Since, when the refrigerant, which has descended while swirling, moves from the support portion 71 to the swirl acceleration portion 72, swirling speed increases and intensity of a streamline in the swirling direction increases, the refrigerant becomes less likely to pass through the communication paths 75, and collides with the inside bottom surface of the swirl acceleration portion 72 and subsequently ascends. Therefore, the refrigerant is prevented from passing the partition member 62 to the lower side, which improves the separation performance of oil. In fact, according to an analysis result by the inventors, it is revealed that flow of the refrigerant comes to hardly occur under the partition member 62.

A part of the partition member 62 where the support portion 71 and the swirl acceleration portion 72 are continuously connected to each other is formed in an R shape. This configuration enables the oil and the refrigerant to be guided to the swirl acceleration portion 72 smoothly. In particular, although the refrigerant descends while swirling, the refrigerant is facilitated to pass through the communication paths 75 when the swirling speed and the intensity of the streamline decreases. Therefore, by guiding the refrigerant from the support portion 71 to the swirl acceleration portion 72 smoothly and preventing the swirling speed and the intensity of the streamline of the refrigerant from decreasing, the refrigerant becomes less likely to pass through the communication paths 75 and the separation performance of oil is thereby improved. In the partition member 62, the swirl acceleration portion 72 is located below the support portion 71, the upper end side of the swirl acceleration portion 72 is continuously formed from the lower end side of the support portion 71, and a radially outer side portion of the upper edge of the support portion 71 is chamfered. This configuration improves workability at the time when the partition member 62 is press-fitted into the separation chamber 42.

In the partition member 62, the plurality of communication paths 75, which penetrate the swirl acceleration portion 72 in horizontal directions, are formed. This configuration causes the refrigerant to become less likely to pass through the communication paths 75 and enables the separation performance of oil to be improved compared with the case of using the structure in which one side is communicated with the other side in the up-down direction. There is no chance that the plurality of communication paths 75 being formed causes the oil to be prevented from being exhausted. In the partition member 62, the two communication paths 75, which are arranged to be opposed to each other in a straight line along a horizontal direction, are formed. This configuration enables the two communication paths 75 to be formed in a single drilling operation, and the partition member 62 thus excels in processability. Thickness variation of cross sections is set to a value less than or equal to 20% of an average thickness in the support portion 71. This configuration enables holding force at the time when the partition member 62 is press-fitted into the inner circumferential surface 63 of the separation chamber 42 to be prevented from deteriorating. Further, since the partition member 62 is formed by press working, formability is improved compared with a solid shape the interior of which is filled with material, and it is thus possible to suppress cost.

(Variations)

Figure 4A:
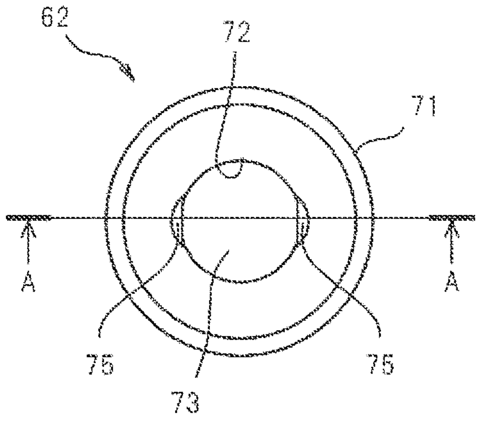
FIGS. 4A to 4C are diagrams illustrative of a variation of the partition member (penetration direction)
Figure 4B:
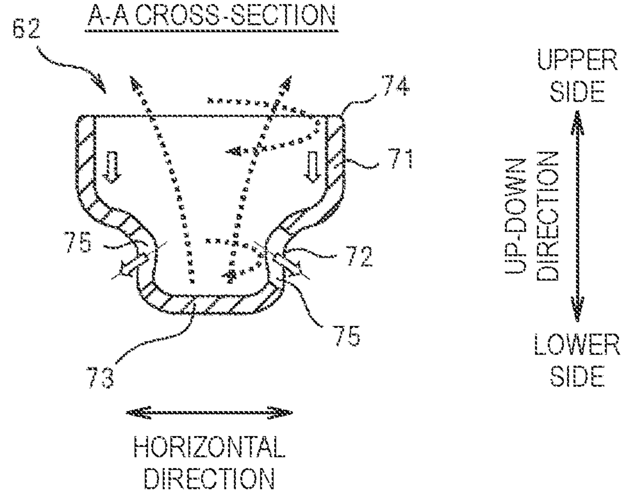
Figure 4C:
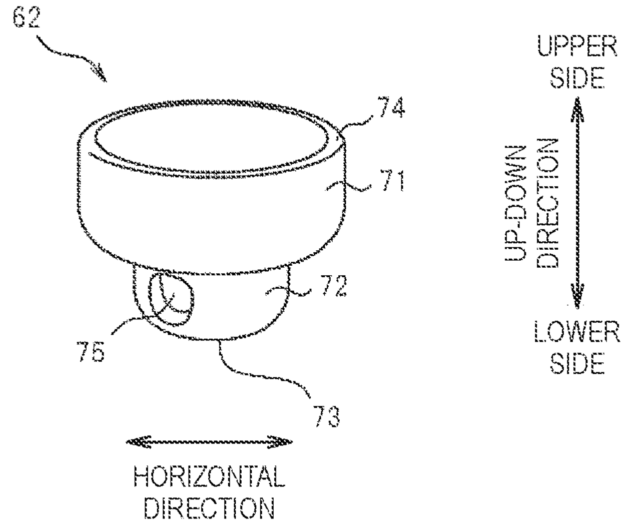

Although, in the first embodiment, the communication paths 75 are caused to penetrate the swirl acceleration portion 72 in radial directions (horizontal directions), the configuration of the communication paths 75 is not limited thereto. Since the communication paths 75 are only required to communicate the radial inside and the radial outside with each other even when penetration directions are not aligned with radial directions, the penetration directions of the communication paths 75 may be tilted in the up-down direction. FIGS. 4A to 4C are diagrams illustrative of a variation of the partition member (penetration direction). In this variation, the communication paths 75 are caused to penetrate the swirl acceleration portion 72 in such a way that as the communication paths 75 advance to the radially outer side, the communication paths 75 go down. This configuration enables processing of the communication paths 75 to be performed more easily and the oil to be caused to pass through the communication paths 75 to the lower side of the partition member 62 more easily than in a case where the communication paths 75 are caused to penetrate the swirl acceleration portion 72 in the radial directions.

Figure 5A:
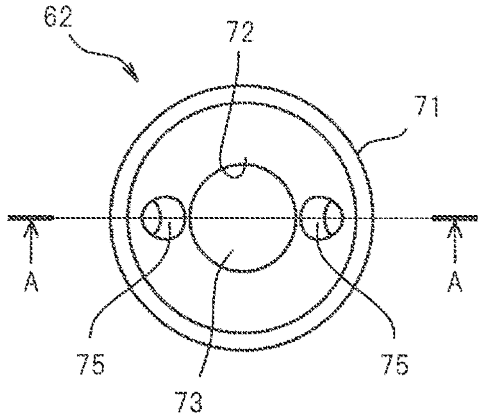
FIGS. 5A to 5C are diagrams illustrative of another variation of the partition member (tapered shape)
Figure 5B:
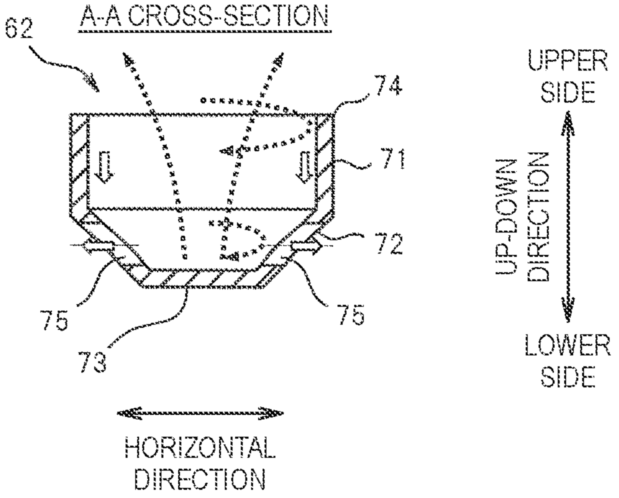
Figure 5C:
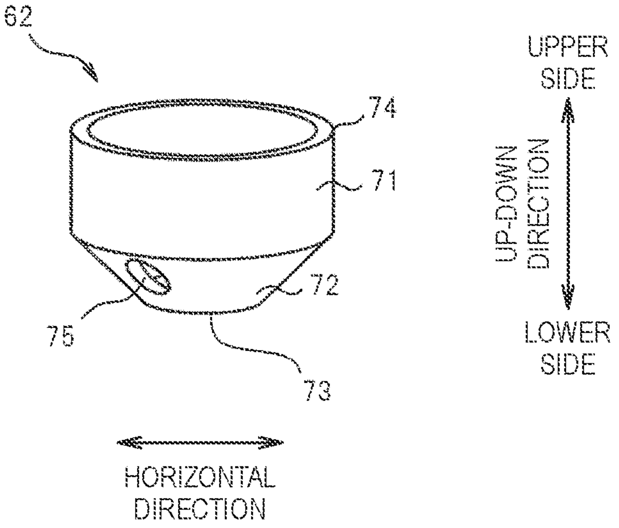

Although, in the first embodiment, a configuration in which the inner diameter of the swirl acceleration portion 72 is made substantially uniform and there is formed a step between the support portion 71 and the swirl acceleration portion 72 was described, the configuration is not limited thereto. The swirl acceleration portion 72 may be configured to have the same diameter as that of the support portion 71 at the upper edge and have a tapered shape the diameter of which becomes smaller toward the lower end. The tapered shape may be linear or nonlinear. FIGS. 5A to 5C are diagrams illustrative of another variation of the partition member (tapered shape). In this variation, the swirl acceleration portion 72 is formed in a linearly tapered shape. Note that the communication paths 75 are caused to penetrate the swirl acceleration portion 72 in radial directions. This configuration enables a step between the support portion 71 and the swirl acceleration portion 72 to be eliminated and the oil and the refrigerant to be guided to the swirl acceleration portion 72 smoothly.

Although, in the first embodiment, two communication paths 75 are formed in the partition member 62, the configuration is not limited thereto, and one or three or more communication paths 75 may be formed. When three or more communication paths 75 are formed, it is preferable to form four communication paths 75 the directions of which are shifted by 90 degrees from each other in the circumferential direction, in consideration of the number of hours required to perform drilling of the communication paths 75. Although, in the first embodiment, the partition member 62 is formed by press working, the configuration is not limited thereto, and the partition member 62 may be cast. Further, it may be configured such that the support portion 71 and the swirl acceleration portion 72 are formed as separate members and subsequently joined to each other.

Second Embodiment (Configuration)

Figure 6:
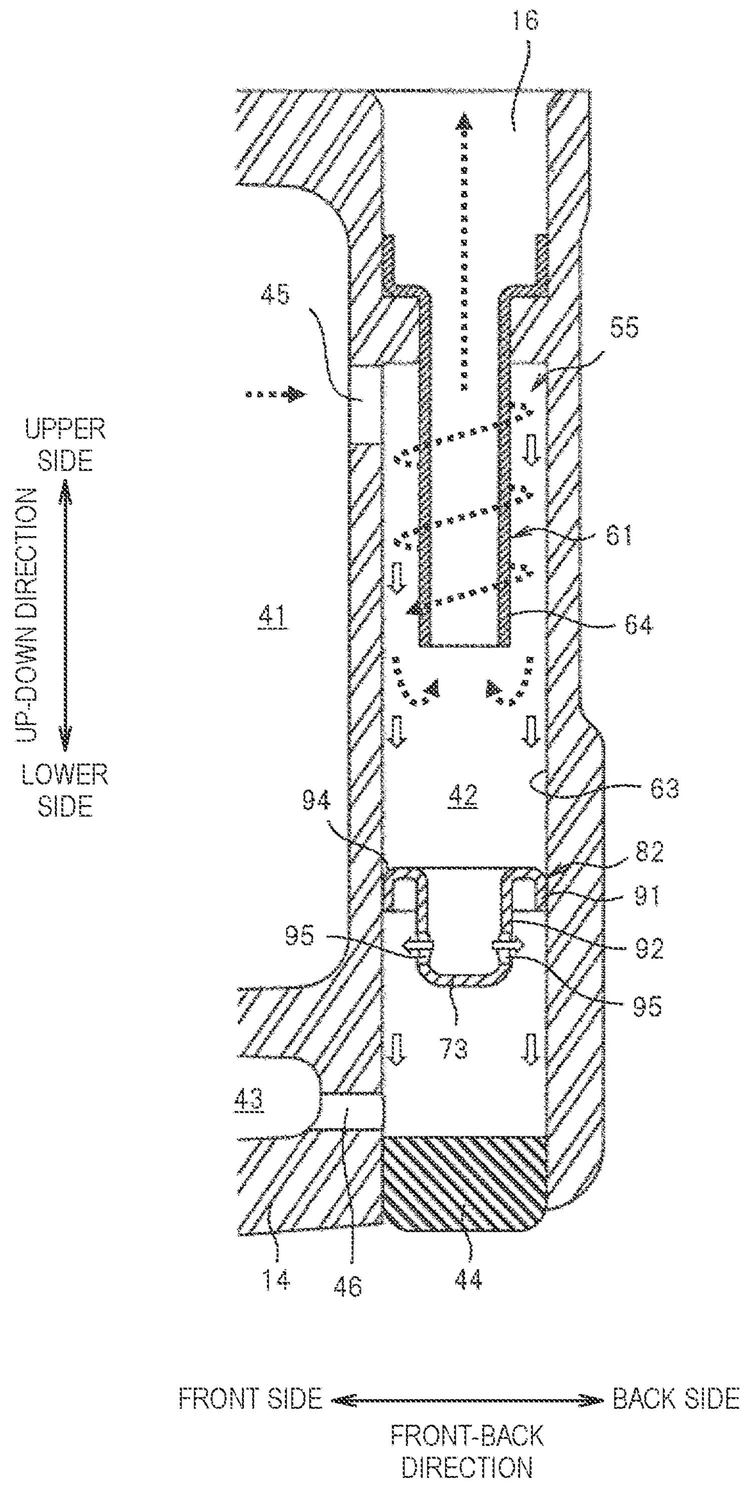
FIG. 6 is an enlarged cross-sectional view of a separation chamber in a second embodiment.
Figure 7A:
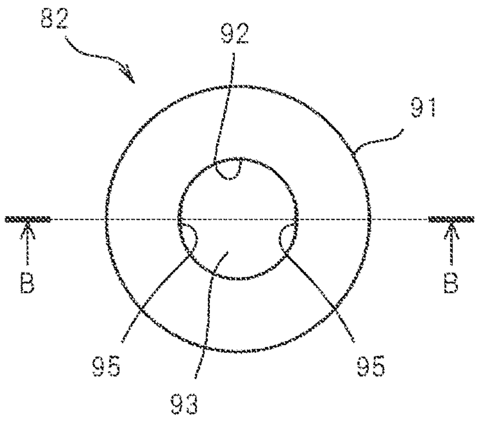
FIGS. 7A to 7C are diagrams illustrative of a partition member of the second embodiment.
Figure 7B:
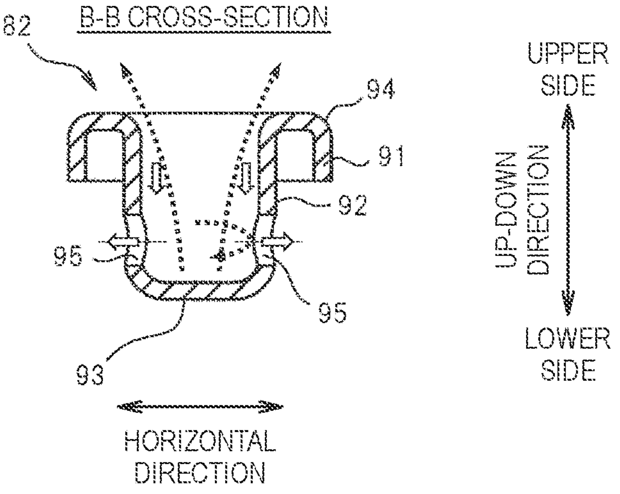
Figure 7C:
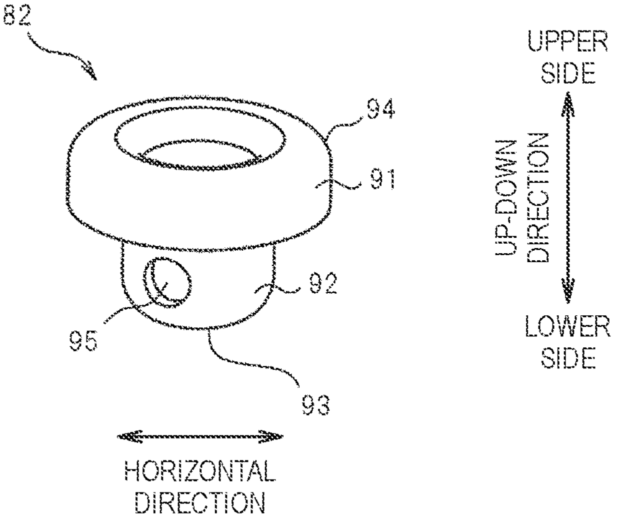

A second embodiment relates to another configuration of a partition member. Detailed description of a part common to the afore-described first embodiment will be omitted. FIG. 6 is an enlarged cross-sectional view of a separation chamber in the second embodiment. An oil separation structure 55 includes a partition member 82. FIGS. 7A to 7C are diagrams illustrative of the partition member. FIGS. 7A, 7B, and 7C illustrate a view of the partition member 82 when viewed from above, a cross-section of the partition member 82 taken along the line B-B of FIG. 7A, and a perspective view of the partition member 82, respectively.

The partition member 82 includes a support portion 91 and a swirl acceleration portion 92. The support portion 91 is formed in a cylindrical shape and supported by an inner circumferential surface 63 of a separation chamber 42. The swirl acceleration portion 92 is formed in a cylindrical shape that has smaller diameter than the support portion 91 and the lower end side of which is closed by a bottom portion 93, and has an upper end side continuously formed from the support portion 91. Specifically, the partition member 82 is formed in a shape in which the swirl acceleration portion 92 is located on the radially inner side of the support portion 91, the upper end side of the swirl acceleration portion 92 is continuously formed from an upper end side of the support portion 91, and the upper end side of the swirl acceleration portion 92 is folded back to the radially outer side. A part where the upper end side of the support portion 91 and the upper end side of the swirl acceleration portion 92 are continuously connected to each other is formed in an R shape. That is, a lower end side of the support portion 91 and the upper end side of the swirl acceleration portion 92 are connected to each other by a curved surface in such a manner that no step is generated. The partition member 82 is formed by press working.

In the swirl acceleration portion 92, two communication paths 95 that communicate the radial inside and the radial outside with each other are formed. The two communication paths 95 are circular holes that are caused to penetrate the swirl acceleration portion 92 in radial directions and that have the same diameter, and are arranged to be opposed to each other in a straight line passing the center of a circle when viewed in the up-down direction. Therefore, separated oil descends along an inner circumferential surface of the support portion 91 and an inner circumferential surface of the swirl acceleration portion 92 and is exhausted to the radially outer side through the two communication paths 95. In this manner, the separated oil passes the partition member 62 to the lower side and flows to a storage chamber 43. The communication paths 95 are arranged on the bottom portion 93 side of the swirl acceleration portion 92 lest the oil stay on an inside bottom surface of the swirl acceleration portion 92.

Since the support portion 91 is press-fitted into the inner circumferential surface 63 of the separation chamber 42, an outer diameter dimension of the support portion 91 is set slightly larger than an inner diameter dimension of the separation chamber 42 in order to form an interference. On a corner portion 94 that is located on the radially outer side of the upper edge of the support portion 91, an R shape is formed by press working. The swirl acceleration portion 92 is configured to have a smaller diameter than the support portion 91 in order to accelerate swirling of refrigerant, which has descended while swirling along the inner circumferential surface 63 of the separation chamber 42. When an inner diameter dimension of the swirl acceleration portion 92 is made excessively small, exhaust performance of the oil deteriorates, and, when the inner diameter dimension of the swirl acceleration portion 92 is made excessively large, effect of accelerating the swirling of the refrigerant deteriorates. Therefore, the inner diameter dimension of the swirl acceleration portion 92 needs to be set to, for example, a value within a range from 40% to 60% of an inner diameter dimension of the support portion 91, and preferably set to approximately 50%.

(Operation)

Next, major operational effects of the second embodiment will be described.

In the present embodiment, the partition member 82 is configured such that the swirl acceleration portion 92 is located on the radially inner side of the support portion 91 and the upper end side of the swirl acceleration portion 92 is continuously formed from the upper end side of the support portion 91. Although, in the first embodiment, chamfering needs to be performed on the radially outer side of the upper edge of the support portion 71, in the second embodiment, an R shape is formed by press working on the corner portion 94, which is located on the radially outer side of the upper edge of the support portion 91. Therefore, chamfering can be omitted, as a result of which it is possible to reduce cost. Other operational effects are the same as those in the afore-described first embodiment.

(Variation)

Figure 8A:
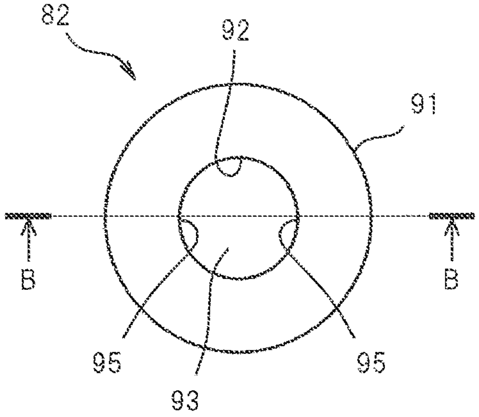
FIGS. 8A to 8C are diagrams illustrative of a variation of the partition member (long hole).
Figure 8B:
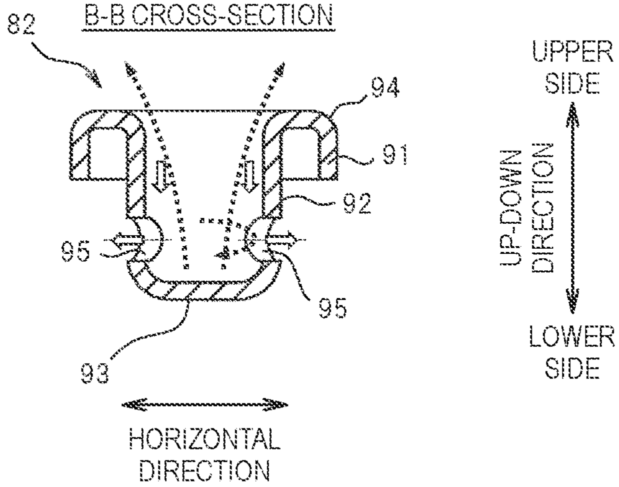
Figure 8C:
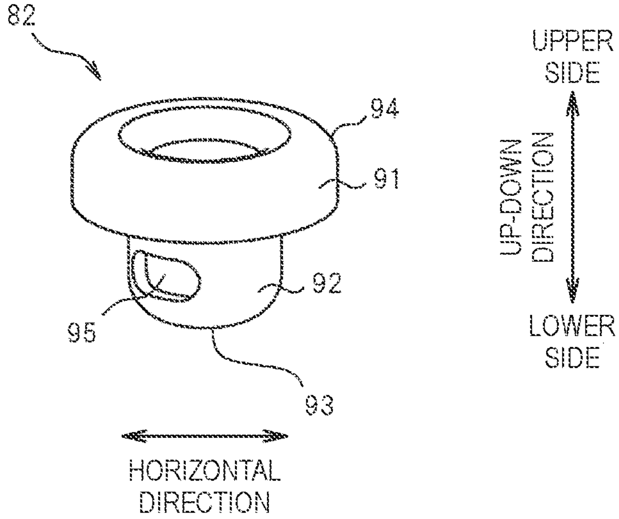

Although, in the second embodiment, the communication paths 95 are formed in circular holes, the configuration is not limited thereto. Since the communication paths 95 are only required to communicate the radial inside and the radial outside with each other, the communication paths 95 may be formed in arbitrary shapes. FIGS. 8A to 8C are diagrams illustrative of a variation of the partition member (long hole). In this variation, the communication paths 95 are formed in long hole shapes or elliptical shapes that are elongated in the circumferential direction. Note that the communication paths 75 are caused to penetrate the swirl acceleration portion 92 in radial directions. This configuration enables opening area to be increased and the oil to be caused to pass the partition member 62 to the lower side more easily compared with a case in which the communication paths 95 are formed in circular holes (perfect circles). Although, when the same opening area is to be obtained, the communication paths 95 may be formed in long holes elongated in the up-down direction, there is a possibility that up-down dimension of the swirl acceleration portion 92 increases. Therefore, elongating the communication paths 95 in the circumferential direction is more advantageous from the viewpoint of space-saving.

Hereinbefore, although described with reference to a limited number of embodiments, the scope of rights is not limited thereto, and modifications of the embodiments based on the above disclosure are obvious to those skilled in the art.

REFERENCE SIGNS LIST

11 Compressor
12 Front housing
13 Center housing
14 Rear housing
16 Exhaust port

21 Suction chamber
22 Electric motor
23 Rotating shaft
24 Stationary scroll
25 Movable scroll
26 Stationary-side wrap
27 Movable-side wrap
28 Compression chamber
29 Back pressure chamber
31 Boss
32 Crank end portion
33 Discharge hole
34 Discharge valve
35 Bolt
41 Discharge chamber
42 Separation chamber
43 Storage chamber
44 Closing member
45 Communication hole
46 Communication hole
51 Oil return flow path
52 Oil return flow path
53 Oil return flow path
55 Oil separation structure
61 Exhaust pipe
62 Partition member
63 Inner circumferential surface
64 Outer circumferential surface
71 Support portion
72 Swirl acceleration portion
73 Bottom portion
74 Corner portion
75 Communication path
82 Partition member
91 Support portion
92 Swirl acceleration portion
93 Bottom portion
94 Corner portion
95 Communication path

The invention claimed is:

1. A compressor configured to compress a heat transfer medium containing oil, comprising an oil separation structure configured to separate the heat transfer medium and the oil, the heat transfer medium and the oil being compressed, from each other, wherein the oil separation structure includes:

a separation chamber, the separation chamber being a cylindrical internal space with a central axis aligned with an up-down direction, configured to separate the heat transfer medium and the oil from each other by causing the heat transfer medium and the oil to flow into the separation chamber and swirl along an inner circumferential surface in a circumferential direction; and a partition member configured to partition an inside of the separation chamber in the up-down direction, the partition member includes:

a cylindrical support portion supported by an inner circumferential surface of the separation chamber; and a cylindrical swirl acceleration portion having an upper end side continuously formed from the support portion, having a smaller diameter than the support portion, and having a lower end side closed, and the swirl acceleration portion has a communication path formed, the communication path communicating a radial inside and a radial outside with each other, and accelerates swirling of the heat transfer medium, the heat transfer medium having descended while swirling along the inner circumferential surface of the separation chamber, wherein the partition member has a part where the support portion and the swirl acceleration portion are continuously connected to each other formed in an R shape, and the partition member has the swirl acceleration portion located on a radially inner side of the support portion and the upper end side of the swirl acceleration portion continuously formed from an upper end side of the support portion.

2. The compressor according to claim 1, wherein the partition member has the swirl acceleration portion located below the support portion, the upper end side of the swirl acceleration portion continuously formed from a lower end side of the support portion, and a radially outer side of an upper edge of the support portion chamfered.

3. The compressor according to claim 2, wherein the partition member has a plurality of the communication paths formed, the communication paths penetrating the swirl acceleration portion in horizontal directions.

4. The compressor according to claim 2, wherein the partition member has a thickness variation of cross sections less than or equal to 20% of an average thickness in the support portion.

5. The compressor according to claim 1, wherein the partition member has a plurality of the communication paths formed, the communication paths penetrating the swirl acceleration portion in horizontal directions.

6. The compressor according to claim 5, wherein the partition member has a thickness variation of cross sections less than or equal to 20% of an average thickness in the support portion.

7. The compressor according to claim 5, wherein the partition member has two communication paths formed, the communication paths being arranged to be opposed to each other in a straight line along a horizontal direction.

8. The compressor according to claim 7, wherein the partition member has a thickness variation of cross sections less than or equal to 20% of an average thickness in the support portion.

9. The compressor according to claim 1, wherein the partition member has a thickness variation of cross sections less than or equal to 20% of an average thickness in the support portion.

10. The compressor according to claim 1, wherein the partition member has a thickness variation of cross sections less than or equal to 20% of an average thickness in the support portion.

* * * * *